United States Patent
Swaminathan et al.

(10) Patent No.: US 12,547,787 B2
(45) Date of Patent: Feb. 10, 2026

(54) FIRE SYSTEM FLOOR PLAN LAYOUT GENERATION

(71) Applicant: Honeywell International Inc., Charlotte, NC (US)

(72) Inventors: Sriramakrishnan Swaminathan, Hosur (IN); Sudeep Jayakumar Duge, Bangalore (IN); Nehru Selvan, Dindigul (IN); Ramesh Subbaiah, Bangalore (IN); Deepika Sandeep, Bangalore (IN); Vishwanath Gupta, Ranchi (IN); Swaroop Reddy Konala, Hyderabad (IN); Aakash D, Madurai (IN); Surjayan Ghosh, Kolkata (IN); Rohil Pal, Kanpura (IN); Chhavi Chawla, Jaipur (IN); Himanshu Goyal, Bangalore (IN); Reet Kaur, Ghaziabad (IN)

(73) Assignee: Honeywell International Inc., Charlotte, NC (US)

( * ) Notice: Subject to any disclaimer, the term of this patent is extended or adjusted under 35 U.S.C. 154(b) by 979 days.

(21) Appl. No.: 17/716,191

(22) Filed: Apr. 8, 2022

(65) Prior Publication Data

US 2023/0325547 A1   Oct. 12, 2023

(51) Int. Cl.
*G06F 30/13*     (2020.01)
*G08B 17/00*     (2006.01)
(52) U.S. Cl.
CPC ............. *G06F 30/13* (2020.01); *G08B 17/00* (2013.01)

(58) Field of Classification Search
CPC .......... G06F 30/13; G06F 30/27; G06F 30/18
See application file for complete search history.

(56) References Cited

U.S. PATENT DOCUMENTS

| 8,155,943 B2 | 4/2012 | Nasle |
| 10,455,352 B2 | 10/2019 | Vangipuram |

(Continued)

FOREIGN PATENT DOCUMENTS

| WO | WO-2009018868 A1 * | 2/2009 | ............. A62C 35/02 |
| WO | 2014128786 A1 | 8/2014 | |

(Continued)

OTHER PUBLICATIONS

Mace et al, "A System to Detect Rooms in Architectural Floor Plan Images", Jun. 9, 2010, DAS, pp. 167-174 (Year: 2010).*

(Continued)

*Primary Examiner* — Rehana Perveen
(74) *Attorney, Agent, or Firm* — Brooks, Cameron & Huebsch, PLLC

(57) ABSTRACT

Devices, systems, and methods for fire system floor plan layout generation are described herein. In some examples, one or more embodiments include a computing device comprising a memory and a processor to execute instructions stored in the memory to receive a floor plan layout of a space, define, via an object placement model utilizing the floor plan layout, placement locations of fire system objects for the floor plan layout, and generate, using the object placement model, a fire system floor plan for a fire system for the space including the fire system objects, wherein the fire system objects are located in the defined placement locations on the fire system floor plan from the floor plan layout.

19 Claims, 5 Drawing Sheets

(56) References Cited

U.S. PATENT DOCUMENTS

| | | | |
|---|---|---|---|
| 11,219,147 B2 * | 1/2022 | Barber | H05K 7/1467 |
| 11,961,387 B2 * | 4/2024 | Otis | G08B 25/14 |
| 12,086,506 B2 * | 9/2024 | Fernandez-Orellana | G06F 30/13 |
| 12,124,772 B2 * | 10/2024 | Murphy | G06F 30/12 |
| 12,125,127 B2 * | 10/2024 | Haji-Valizadeh | G01R 33/5608 |
| 12,125,137 B2 * | 10/2024 | Tveito | H04L 65/1063 |
| 2015/0148969 A1 | 5/2015 | Sasaki et al. | |
| 2018/0121571 A1 | 5/2018 | Tiwari et al. | |
| 2020/0082029 A1 | 3/2020 | Hartfiel | |
| 2021/0150088 A1 | 5/2021 | Gallo et al. | |
| 2021/0248282 A1 | 8/2021 | Fernandez-Orellana et al. | |
| 2022/0071046 A1 * | 3/2022 | Chapel | H05K 7/1492 |

FOREIGN PATENT DOCUMENTS

| | | | | |
|---|---|---|---|---|
| WO | WO-2019043676 A1 * | 3/2019 | | G06F 30/15 |
| WO | WO-2021074665 A1 * | 4/2021 | | G06N 5/02 |

OTHER PUBLICATIONS

Wang et al, "Room Classification in Floor Plan Recognition", Nov. 13, 2020, ICAIP, pp. 48-54 (Year: 2020).*

* cited by examiner

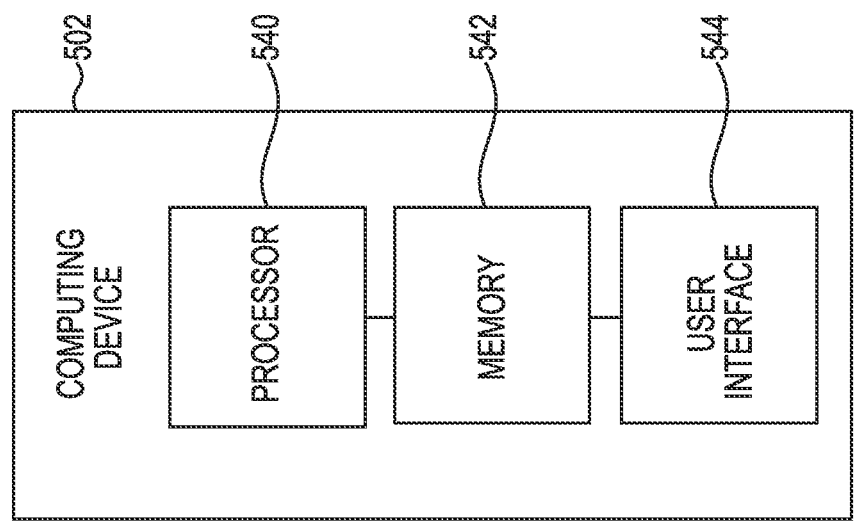

FIRE SYSTEM FLOOR PLAN LAYOUT GENERATION

TECHNICAL FIELD

The present disclosure relates to devices, systems, and methods for fire system floor plan layout generation.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system may include a fire system having a control panel (e.g., a fire control panel) and a number of fire system objects (e.g., sensors, sounders, pull stations, etc.) located throughout the facility (e.g., on different floors and/or in different rooms of the facility) that can perform an action when a hazard event is occurring in the facility and provide a notification of the hazard event to the occupants of the facility via alarms or other mechanisms.

BRIEF DESCRIPTION OF THE DRAWINGS

FIG. 5 is an example of a computing device for public address system auditing, in accordance with one or more embodiments of the present disclosure.

DETAILED DESCRIPTION

Figure 1:
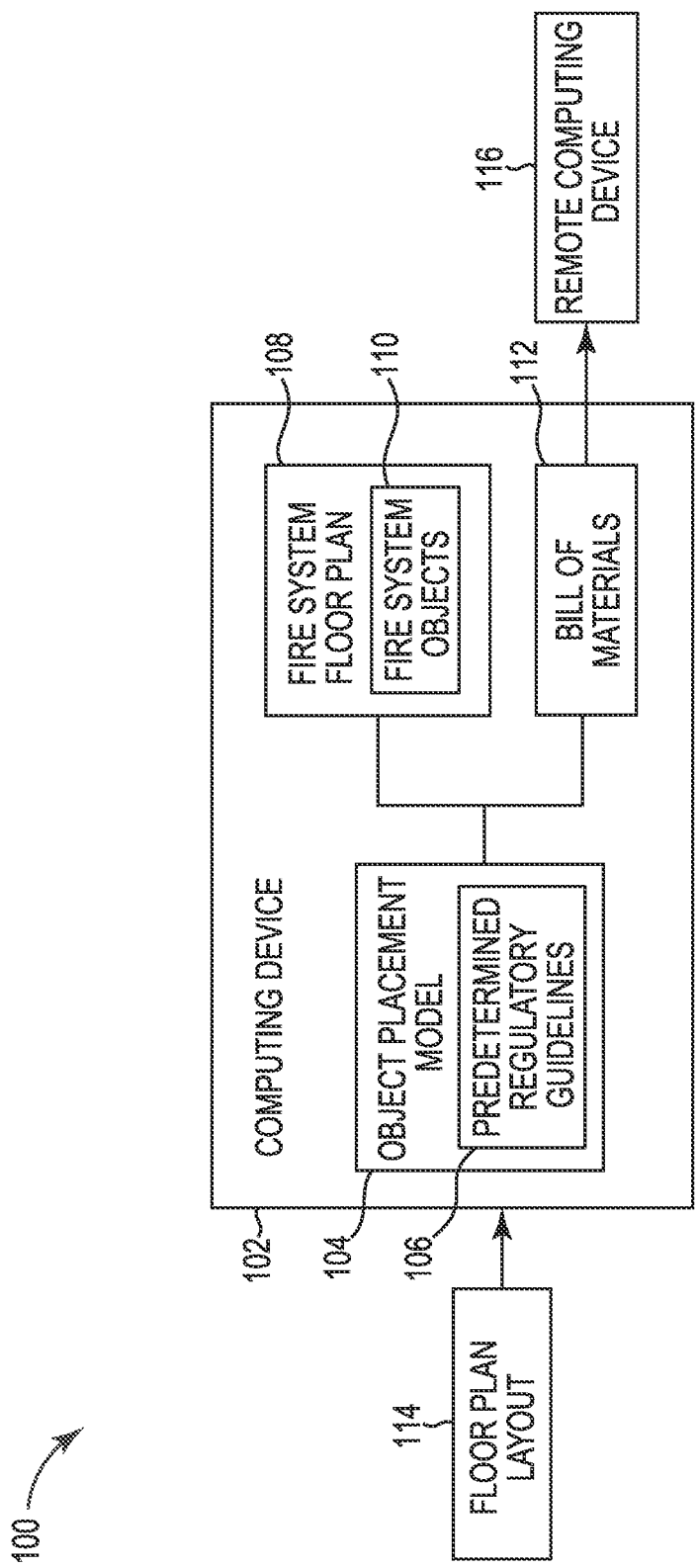
FIG. 1 is an example of a system for fire system floor plan layout generation, in accordance with one or more embodiments of the present disclosure.

Devices, systems, and methods for fire system floor plan layout generation are described herein. In some examples, one or more embodiments include a computing device comprising a memory and a processor to execute instructions stored in the memory to receive a floor plan layout of a space, define, via an object placement model utilizing the floor plan layout, placement locations of fire system objects for the floor plan layout, and generate, using the object placement model, a fire system floor plan for a fire system for the space including the fire system objects, wherein the fire system objects are located in the defined placement locations on the fire system floor plan from the floor plan layout.

Design of a fire system can include laying out the fire system for a particular space. As used herein, the term "fire system" refers to a system of devices to provide an audible and/or visible warning in an emergency event. For example, the fire system can utilize fire system objects to warn occupants of the emergency event occurring in the space, such as a fire. As used herein, the term "fire system objects" refers to a device that can receive an input relating to an event and/or generate an output relating to an event. Such fire system objects can be a part of the fire system of a space and can include devices such as fire sensors, smoke detectors, heat detectors, carbon monoxide (CO) detectors, or combinations of these; interfaces; manual call points (MCPs), pull stations; input/output modules; aspirating units; and/or audio/visual devices (e.g., speakers, sounders, flashers, buzzers, microphones, cameras, video displays, video screens, etc.), relay output modules, among other types of fire system objects.

In order to design such a fire system, a user, such as a technician, may have to determine an amount of fire system objects for the space, which fire system objects to utilize, where to place those fire system objects, etc. Additionally, the user may have to perform such design and placement according to regulatory guidelines associated with a jurisdiction where the space is located.

Designing a fire system for a particular space can be a challenging task. Such a fire system installation can include considerations such as initial design and layout, installation guidelines, regulatory guidelines, product specifications, as well as commissioning and/or maintenance processes of the fire system. For example, a user who does not have experience in fire systems may find it challenging to design a fire system according to regulatory guidelines associated with a jurisdiction where the space is located and install a system properly according to installation guidelines and/or product specifications. Further, commissioning of the system properly as well as maintenance of the system can be a time consuming and technically challenging process.

Accordingly, design of such fire systems typically falls to users with experience in fire systems. However, reliance on users who have such experience for fire system design can take time and/or may be costly. For example, various parties may be involved in the fire system design process (e.g., users involved with planning, different users involved with design, further users involved with purchasing equipment, etc.). Further, such an approach may be costly due to time and equipment costs.

Fire system floor plan layout generation, according to the present disclosure, can allow for an automated approach for fire system design. Automating the design of the fire system according to regulatory and installation guidelines as well as product specifications can allow for a faster, more efficient approach to fire system design as compared with previous approaches as less users may be involved in the design of a fire system. Such an approach can reduce dependency on skilled labor, reducing design, installation, commissioning, and maintenance costs associated with a fire system as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for fire system floor plan layout generation, in accordance with one or more embodiments of the present disclosure. The system 100 can include a computing device 102, a floor plan layout 114, and a remote computing device 116.

As mentioned above, a facility can be a space such as a building, a campus (e.g., building(s) with outdoor spaces), etc. and can be designed to include a fire system. In some examples, the facility can include various spaces within. In order to generate a fire system for such a facility, the computing device 102 can receive a floor plan layout 114 of the space. As used herein, the term "floor plan layout" refers to a drawing of a space that includes relationships between rooms, spaces, and/or other physical features of the space. For example, the floor plan layout 114 can include a drawing showing locations of various rooms within the space, the sizes of the various rooms in the space, locations of ingress/egress points for the rooms and/or the space, text describing the various rooms within the space, symbols describing items within the space, etc.

In some embodiments, the floor plan layout 114 can be received as a computer-aided design (CAD) file format. The CAD file format can be a digital file format utilized by a CAD software that includes the floor plan layout 114 showing locations of various rooms within the space, the sizes of the various rooms in the space, locations of ingress/egress points for the rooms and/or the space, text describing the various rooms within the space, symbols describing items within the space, etc. CAD file formats may include .DWG, .MODEL, .ASM, .DWF, .DXF, .IGES, among other examples of CAD file formats.

Although the floor plan layout 114 is described above as being received by the computing device 102 in a CAD file format, embodiments of the present disclosure are not so limited. For example, the floor plan layout 114 of the space may be received by the computing device 102 via a user input. For example, the user can input manually the sizes of the rooms in the floor plan layout 114, the locations of rooms in the floor plan layout 114, the types of rooms in the floor plan layout 114, etc. The computing device 102 can save the manually entered floor plan layout 114 as a graphic image file format, as is further described herein.

In an example in which the floor plan layout 114 is received as a CAD file format, the computing device 102 can convert the CAD file format of the floor plan layout 114 to a graphic image file format. The graphic image file format can be a digital file format which can be utilized to display images. Graphic image file formats may include .TIFF, .JPEG (or .JPG), .BMP, .PNG, .PDF, among other examples of graphic image file formats. For example, the computing device 102 can convert the CAD file format (e.g., DWG) of the floor plan layout 114 to a JPEG graphic image file format.

As illustrated in FIG. 1, the computing device 102 can include an object placement model 104. As used herein, an "object placement model" can be a collection of various machine learning algorithms, data associated with fire systems, and data associated with space characteristics. For example, the data associated with fire systems can include rules defining a type, number, and placement of fire system objects 110 based on characteristics of a space. The rules may be part of predetermined regulatory guidelines 106, as is further described herein. Characteristics of a space can include architectural and/or spatial information associated with the space and can be included in the floor plan layout 114.

The object placement model 104 can further include predetermined regulatory guidelines 106. As mentioned above, the predetermined regulatory guidelines 106 can include rules defining a type, number, and placement of fire system objects 110 based on characteristics of a space. For example, the predetermined regulatory guidelines 106 may include a rule that a space that exceeds a threshold size is to have at least three fire system objects 110, based on the layout of the space the three fire system objects 110 are to be placed in predetermined locations (e.g., four feet from walls), and that based on the room type (e.g., a kitchen), the space is to include heat detectors instead of smoke detectors. Such predetermined regulatory guidelines 106 can be guidelines established by a jurisdiction in which the space is located (e.g., by city, county, region, state, country, etc.), guidelines established by a standards organization, etc. For example, the predetermined regulatory guidelines 106 may be, for instance, guidelines established by the country (e.g., India) in which the space is located. As another example, the predetermined regulatory guidelines 106 may be guidelines established by the National Fire Protection Association (NFPA), among other examples.

In some embodiments, as regulatory guidelines are updated, the predetermined regulatory guidelines 106 can accordingly be updated. For example, the computing device 102 may be connected (e.g., permanently or periodically) to a remote server that can provide updated predetermined regulatory guidelines 106 (e.g., as they are released) to be placed in the object placement model 104.

Utilizing the received floor plan layout 114 of the space, the computing device 102 can define, via the object placement model 104, placement locations of fire system objects 110 for the floor plan layout 114. As mentioned above, fire system objects 110 can be devices utilized in a fire system, and can include fire sensors, smoke detectors, heat detectors, carbon monoxide (CO) detectors, or combinations of these; interfaces; manual call points (MCPs), pull stations; input/output modules; aspirating units; and/or audio/visual devices (e.g., speakers, sounders, flashers, buzzers, microphones, cameras, video displays, video screens, etc.), relay output modules, among other types of fire system objects 110. Placement locations of these fire system objects 110 can be defined via machine learning and the predetermined regulatory guidelines 106 included in the object placement model 104, as is further described herein.

To begin the process, the computing device 102 can utilize the graphic image file format (e.g., JPEG) of the floor plan layout 114. For example, the computing device 102 can cause the object placement model 104 to detect rooms on the graphic image file format of the floor plan layout 114 via machine learning techniques. For instance, the object placement model 104 can utilize deep learning image processing to analyze the floor plan layout 114 to detect the boundaries of rooms, and therefore detect the rooms included in the floor plan layout 114.

Once the object placement model 104 has determined the boundaries of the rooms to detect the rooms included in the floor plan layout 114, the object placement model 104 can classify the detected rooms into room types. For example, the object placement model 104 can utilize text recognition on the graphic image file format of the floor plan layout 114 to determine a first room type, a second room type, a third room type, etc. For instance, the object placement model 104 can classify the first room type as an office, the second room type as a kitchen, the third room type as a conference room, etc. Text recognition techniques can utilize optical character recognition (OCR) to scan the floor plan layout 114 to detect text associated with the detected rooms to classify the room types, among other types of text recognition techniques. For example, the object placement model can detect text associated with the first room (e.g., "OFFICE", which may be written on the floor plan layout 114 in an area associated with the first room) to determine the first room type to be an office, etc.

Once the object placement model 104 has detected the rooms and the room types in the floor plan layout 114, the object placement model 104 can determine a number of fire system objects 110 to be placed and define the placement locations of the number of fire system objects 110 via machine learning techniques based on the detected boundaries, the room types, and the predetermined regulatory guidelines 106. For example, the object placement model 104 can utilize K-means clustering in order to determine a number of fire system objects 110 in each room in the space and the placement locations of the number of fire system objects 110 in each room in the space, as is further described herein.

For instance, the value of the "K" parameter of the K-means clustering technique can determine a number of fire system objects 110 to be placed within a space. Initially, the K-means clustering can begin with a single cluster of K=1 with the size of the cluster set to a predetermined amount set by the predetermined regulatory guidelines 106 (e.g., 7 meter spacing between fire system objects 110) and the location of the cluster in a predetermined location in the space. The object placement model 104 then determines whether the single cluster of K=1 is enough to cover all points in the space (e.g., whether one fire system object covers the entire area of the space). If yes, then the object placement model 104 determines that the space is to include one fire system object at the placement location in the space. If no, then the K-means clustering technique is adjusted to run with a cluster of K=2 clusters at the same cluster size (e.g., 7 meters). In this iteration, the K-means clustering technique readjusts the cluster centers (e.g., the position of the fire system objects 110) to optimally place them within the space to maximize coverage of the space. This K-means clustering technique is iterated until all points in the space are covered under a cluster (e.g., a fire system object). Accordingly, if the cluster of K=2 clusters covers all points in the space, then the space is to include two fire system objects 110, and if the cluster of K=3 clusters covers all points in the space, then the space is to include three fire system objects 110, etc.

Additionally, the object placement model can determine a type of the number of fire system objects 110 based on the classified room types above. In a first example, if the space is determined to have two fire system objects 110 and the space is determined to be an office, the object placement model 104 can determine the two fire system objects 110 to be smoke detectors based on the predetermined regulatory guidelines 106 dictating use of smoke detectors in such a space type of such a size. In a second example, if the space is determined to have one fire system object and the space is determined to be kitchen, the object placement model 104 can determine the fire system object to be a heat detector based on the predetermined regulatory guidelines 106 dictating use of heat detector in such a space type. In a third example, if the space is determined to have two fire system objects 110 and the space is determined to be conference room, the object placement model 104 can determine one fire system object to be a heat detector and one fire system object to be a smoke detector based on the predetermined regulatory guidelines 106 dictating use of such devices in such a space type. In other words, the object placement model 104 can utilize the predetermined regulatory guidelines 106 to determine a type of fire system object based on the size of the space and/or the type of the space.

Although the fire system object types are described above as being smoke detectors and heat sensors, embodiments of the present disclosure are not so limited. For example, the object placement model 104 can utilize the above described techniques to define and place other fire system objects 110, including fire sensors, carbon monoxide (CO) detectors, or combinations of these; interfaces; manual call points (MCPs), pull stations; input/output modules; aspirating units; and/or audio/visual devices (e.g., speakers, sounders, flashers, buzzers, microphones, cameras, video displays, video screens, etc.), relay output modules, among other types of fire system objects 110.

Once the placement locations of the fire system objects 110 are defined for placement on a fire system floor plan 108 (e.g., as is further described herein), the object placement model 104 can determine a length of cabling to connect the fire system objects 110. The object placement model 104 can again utilize machine learning techniques to determine the length of cabling. For example, as the placement locations of the fire system objects 110 are known, as well as the distances therebetween, the object placement model can optimize a cable length in a step-wise iterative manner using gradient descent optimization techniques. The optimized cable length determination can provide for a length of cabling to connect the fire system objects 110 without excess cabling, which can save on resource costs for the fire system.

Accordingly, as detailed above, the object placement model 104 can determine a number of fire system objects 110 and placement of such fire system objects 110 for each room type in the space. Further, the object placement model 104 can determine a type of each of the fire system objects 110.

Once the number of, placement, and type of fire system objects 110 are determined, the computing device 102 can generate a fire system floor plan for a fire system for the space. As used herein, the term "fire system floor plan" refers to a drawing of a space that includes relationships between rooms, spaces, and/or other physical features of the space, as well as details numbers of, placement locations, and types of fire system objects that comprise a fire system. For example, the fire system floor plan 108 can include a drawing showing locations of various rooms within the space, the sizes of the various rooms in the space, locations of ingress/egress points for the rooms and/or the space, text describing the various rooms within the space, symbols describing a number of fire system objects 110 for the space, placement locations of the fire system objects 110 within the space, and types of fire system objects 110 located within the space, etc. Such a fire system floor plan 108 is further described in connection with FIGS. 2 and 3.

Additionally, the computing device 102 can generate a bill of materials (BOM) 112 for the fire system. As used herein, the term "BOM" refers to a list of materials that comprise a system. For example, the BOM 112 can include the fire system objects and cabling for the fire system objects, a type of each fire system object 110, a quantity of each fire system object 110, a price of each of the fire system objects, predefined locations in the space for each fire system object, and/or a total price for the fire system. The BOM 112 is further described in connection with FIG. 4.

As illustrated in FIG. 1, the computing device 102 can transmit the BOM 12 to a remote computing device 116. For example, once the fire system floor plan 108 is generated a user (e.g., a customer) can review the BOM 112 and accept/approve the generated fire system included in the fire system floor plan 108 detailed in the BOM 112. Upon approval, the computing device 102 can transmit the BOM 112 to the remote computing device 116.

The remote computing device 116 can cause an order to be placed for the fire system based on the BOM 112 received from the computing device 102. For example, the user of the computing device 102 may be a site engineer or technician for the space associated with the fire system floor plan 108 and may desire to order the generated fire system floor plan 108 for the space. Accordingly, the user may approve the fire system floor plan 108 and/or the BOM 112 which can cause the BOM 112 to be transmitted to the remote computing device 116. The remote computing device 116 can cause the order to be submitted for the fire system and the fire system to be manufactured according to the BOM 112.

When the order is submitted, a manufacturing site can manufacture the fire system that was generated for the space. Each of the fire system objects included in the BOM 112 can, during manufacturing, be pre-configured for placement at the defined placement locations on the fire system floor plan 108. Accordingly, when the fire system is manufactured, it can be shipped to a physical address associated with the computing device 102, with the space, etc. Upon arrival, the user may install the fire system in the space by placing the fire system objects in the defined placement locations in the space according to the fire system floor plan 108. Since such devices are pre-configured for placement, installation and commissioning can be efficiently completed.

Although not illustrated in FIG. 1, the computing device 102 can include a user interface. Additionally, the system 100 may include a mobile device having a user interface. Such user interfaces can be utilized to display the fire system floor plan 108, as is further described in connection with FIGS. 2 and 3.

Figure 2:
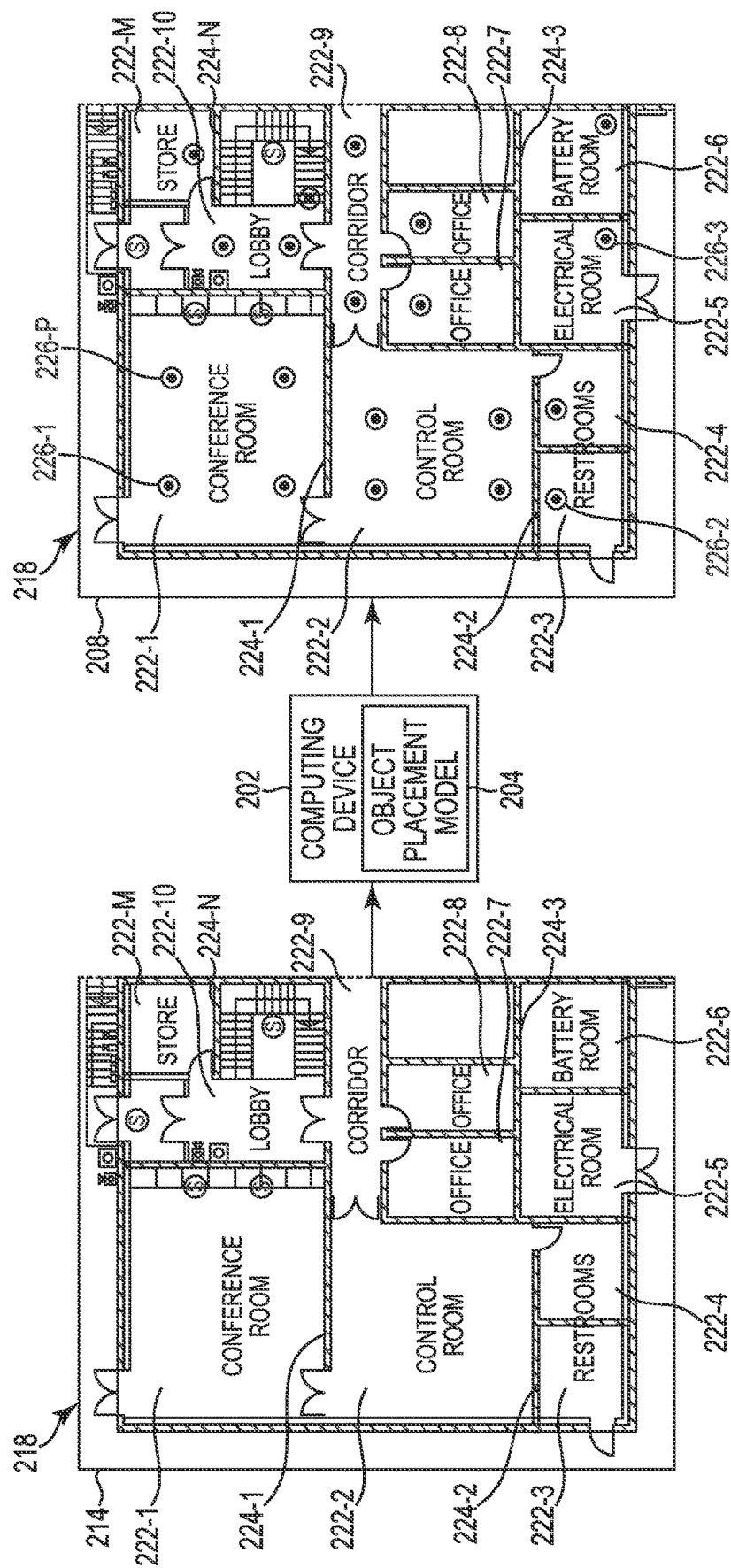
FIG. 2 is an example of generation of a two-dimensional (2D) fire system floor plan from a floor plan layout, generated in accordance with one or more embodiments of the present disclosure.

FIG. 2 is an example of generation of a two-dimensional (2D) fire system floor plan 208 from a floor plan layout 214, generated in accordance with one or more embodiments of the present disclosure. The floor plan layout 214 can include the space 218 and various rooms within the space 218. The fire system floor plan 208 can include fire system objects 226.

As previously described in connection with FIG. 1, in order to design a fire system for a space 218, the computing device 202 can receive a floor plan layout 214 of the space 218. As illustrated in FIG. 2, the floor plan layout 214 can be a drawing of the space 218 and include physical features of the space 218 and their spatial relationships. For example, the floor plan layout 214 can include various rooms, such as rooms 222-1, 222-2, 222-3, 222-4, 222-5, 222-6, 222-7, 222-8, 222-9, 222-10, 222-M, and boundaries 224-1, 224-2, 224-3, 224-N that define the rooms 222-1, 222-2, 222-3, 222-4, 222-5, 222-6, 222-7, 222-8, 222-9, 222-10, 222-M.

The floor plan layout 214 can be received in a CAD file format. In such an example, the computing device 202 can convert the CAD file format to a graphic image file format. However, embodiments of the present disclosure are not so limited. For instance, in some examples, the computing device 202 can receive the floor plan layout 214 via a user input to the computing device 202 and generate the floor plan layout 214 as a graphic image file format.

The object placement model 204 can detect the rooms 222-1, 222-2, 222-3, 222-4, 222-5, 222-6, 222-7, 222-8, 222-9, 222-10, 222-M via deep learning image processing machine learning techniques to detect the boundaries 224-1, 224-2, 224-3, 224-N that define the rooms 222-1, 222-2, 222-3, 222-4, 222-5, 222-6, 222-7, 222-8, 222-9, 222-10, 222-M.

As the computing device 202 has detected the rooms 222-1, 222-2, 222-3, 222-4, 222-5, 222-6, 222-7, 222-8, 222-9, 222-10, 222-M, the object placement model 204 can classify the detected rooms 222-1, 222-2, 222-3, 222-4, 222-5, 222-6, 222-7, 222-8, 222-9, 222-10, 222-M into room types using OCR to scan the floor plan layout 214. The object placement model 204 can scan the floor plan layout 214 via OCR to detect text associated with the detected rooms 222-1, 222-2, 222-3, 222-4, 222-5, 222-6, 222-7, 222-8, 222-9, 222-10, 222-M. For example, the object placement model 204 can detect, using OCR, that room 222-1 has text that reads "CONFERENCE ROOM" on the graphic image file format and accordingly, can classify room 222-1 as a conference room type. Additionally, the object placement model 204 can classify room 222-2 as a control room, rooms 222-3 and 222-4 as restrooms, room 222-5 as an electrical room, room 222-6 as a battery room, rooms 222-7 and 222-8 as offices, room 222-9 as a corridor, room 222-10 as a lobby, and room 222-M as a store.

Once the object placement model 204 has detected the rooms 222 and room types 224, the object placement model 204 can determine a number of fire system objects 226 to be placed and define the placement locations of the number of fire system objects 226 via machine learning techniques based on the detected boundaries, the room types, and predetermined regulatory guidelines included in the object placement model 204 (e.g., not illustrated in FIG. 2). For example, the object placement model 204 can utilize K-means clustering in order to determine a number of fire system objects 226 in each room 222 in the space 218 and the placement locations of the number of fire system objects 226 in each room 222 in the space 218, as previously described in connection with FIG. 1. Accordingly, as illustrated in FIG. 2, the conference room 222-1 can include four fire system objects 226-1, 226-P, the restroom 222-3 can include one fire system object 226-2, the electrical room 222-5 can include one fire system object 226-3, the corridor 222-9 can include two fire system objects, etc.

The object placement model 204 can further determine a type of fire system objects 226 based on the classified room types using the predetermined regulatory guidelines included in the object placement model 204. For example, the room 222-3 is determined to have one fire system object 226-2 and the space is determined to be restroom, the object placement model 204 can determine the fire system object 226-2 to be smoke detectors based on the predetermined regulatory guidelines dictating use of smoke detectors in such a space type of such a size.

Finally, the object placement model 204 can determine, based on the placement locations of the fire system objects 226-1, 226-2, 226-3, 226-P, a length of cabling to connect the fire system objects 226-1, 226-2, 226-3, 226-P. Determining the length of cabling to connect such fire system objects 226-1, 226-2, 226-3, 226-P can optimize the length of cabling to save in resource costs for the fire system.

In some embodiments, the computing device 202 can include a display having a user interface. For example, the user interface can display the fire system floor plan 208 via the display. A user (e.g., operator) of the computing device 202 can interact with computing device 202 via the user interface. For example, the user interface can provide (e.g., display and/or present) information to the user of computing device 202, and/or receive information from (e.g., input by) the user of computing device 202. For instance, in some embodiments, the user interface can be a graphical user interface (GUI) that can provide information to and/or receive information from the user of computing device 202. The display can be, for instance, a touchscreen (e.g., the GUI can include touch-screen capabilities). Alternatively, a display can include a television, computer monitor, mobile device screen, other type of display device, or any combination thereof, connected to computing device 202 and configured to receive a video signal output from the computing device 202.

In some embodiments, the computing device 202 can transmit the fire system floor plan 208 to a different computing device. The different computing device can similarly include a display having a user interface that can display the fire system floor plan 208.

As illustrated in FIG. 2, the fire system floor plan 208 can be a 2D fire system floor plan. That is, a user can view the fire system floor plan 208 in a 2D setting, including the rooms, room types, defined placement locations of the fire system objects 226, and types of the fire system objects 226.

Figure 3:
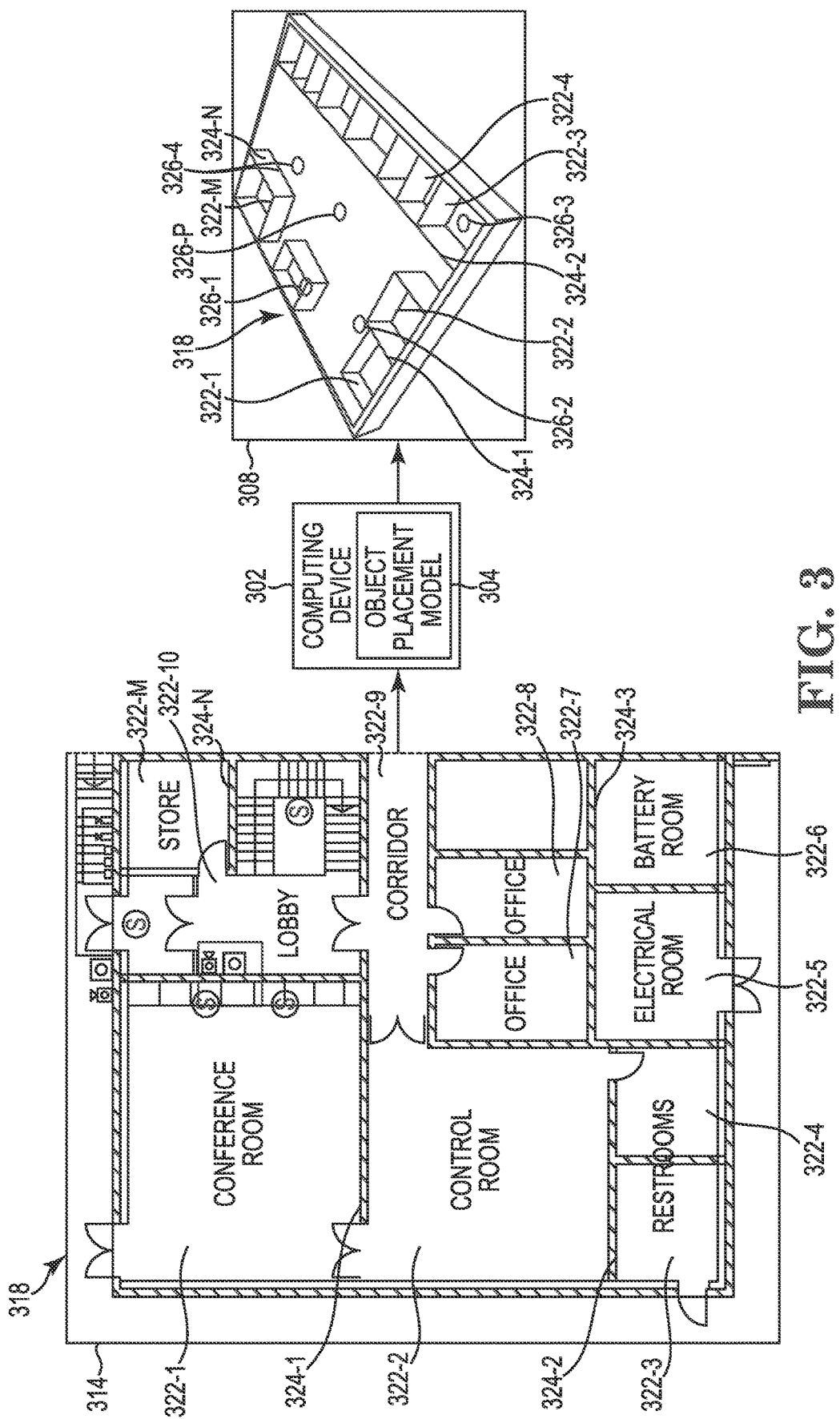
FIG. 3 is an example of generation of a three-dimensional (3D) fire system floor plan from a floor plan layout, generated in accordance with one or more embodiments of the present disclosure.

FIG. 3 is an example of generation of a three-dimensional (3D) fire system floor plan 308 from a floor plan layout 314, generated in accordance with one or more embodiments of the present disclosure. The floor plan layout 314 can include the space 318 and various rooms within the space 318. The fire system floor plan 308 can include fire system objects 326.

As previously described in connection with FIGS. 1 and 2, the computing device 302 can receive a floor plan layout 314 of the space 318, and the object placement model 304 can detect the rooms 322-1, 322-2, 322-3, 322-4, 322-5, 322-6, 322-7, 322-8, 322-9, 322-10, 322-M and classify the detected rooms 322-1, 322-2, 322-3, 322-4, 322-5, 322-6, 322-7, 322-8, 322-9, 322-10, 322-M into room types according to techniques previously described in connection with FIGS. 1 and 2. Additionally, once the object placement model 304 has detected the rooms 322 and room types 324, the object placement model 304 can determine a number of fire system objects 326 to be placed and define the placement locations of the number of fire system objects 326 according to techniques previously described in connection with FIGS. 1 and 2. Further, the object placement model 304 can determine a type of fire system objects 326 based on the classified room types using the predetermined regulatory guidelines included in the object placement model 304. Finally, the object placement model 304 can determine, based on the placement locations of the fire system objects 326, a length of cabling to connect the fire system objects 326 according to techniques previously described in connection with FIGS. 1 and 2.

As illustrated in FIG. 3, the fire system floor plan 308 can be a 3D fire system floor plan. That is, a user can view the fire system floor plan 308 in a 3D setting, including the rooms, room types, defined placement locations of the fire system objects 326, and types of the fire system objects 326.

Figure 4:
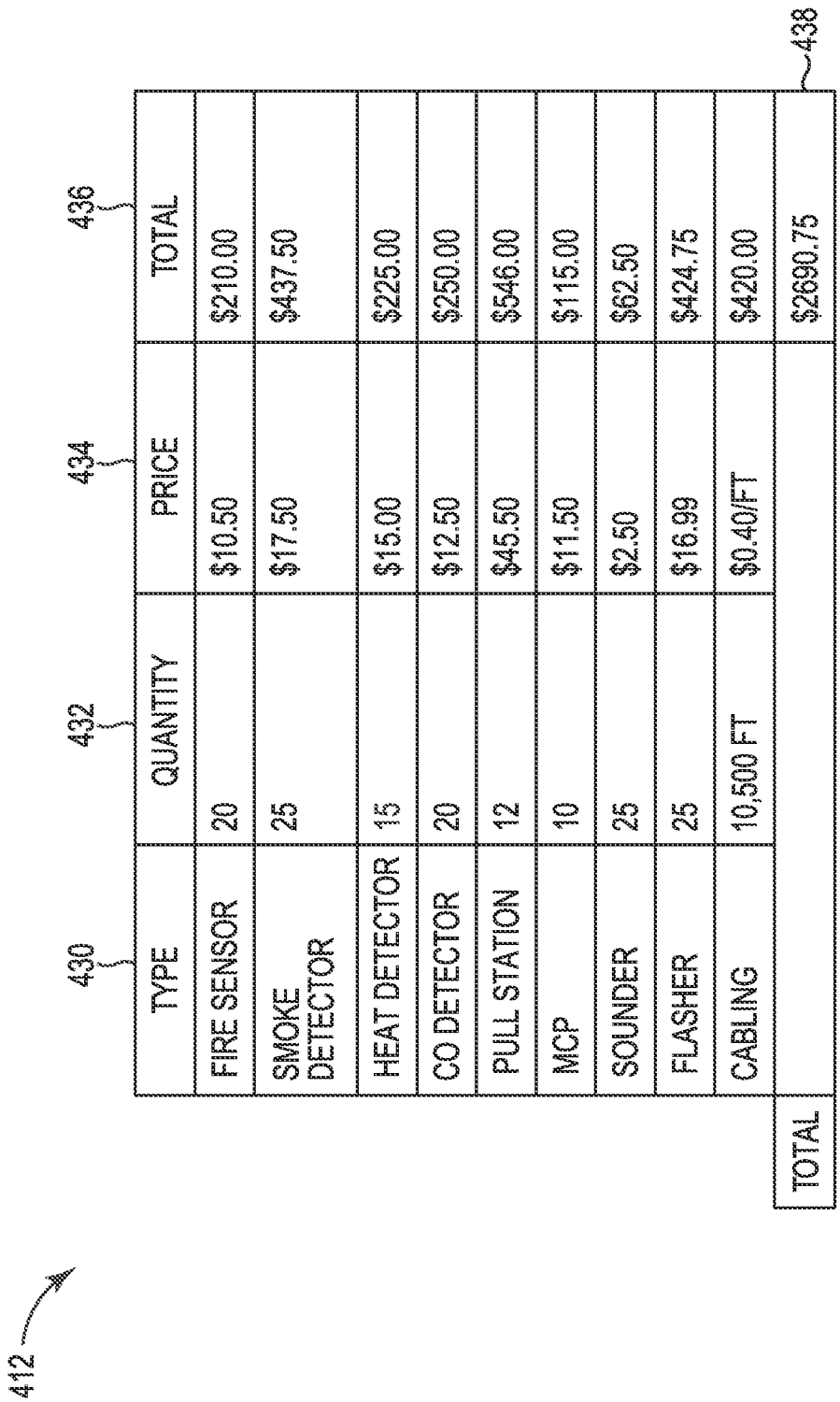
FIG. 4 is an example of a bill of materials for a fire system floor plan, generated in accordance with one or more embodiments of the present disclosure.

FIG. 4 is an example of a bill of materials (BOM) 412 for a fire system floor plan, generated in accordance with one or more embodiments of the present disclosure. As illustrated in FIG. 4, the BOM 412 can include various columns of information relating to the fire system floor plan.

As previously described in connection with FIG. 1, the BOM 412 can include a list of materials that comprise the generated fire system associated with a fire system floor plan. Once the number of fire system objects, type of fire system objects, and cabling length is determined, the BOM 412 can be generated for a user to determine quantity of fire system objects and pricing for the generated fire system, as is further described herein.

As illustrated in FIG. 4, the BOM 412 can include a type 430 of fire system object. As shown in the "Type" column, the fire system objects can include fire sensors, smoke detectors, heat detectors, CO detectors, pull stations, MCPs, sounders, flashers, and cabling, among other types of fire system objects.

Additionally, the BOM 412 can include a quantity 432 of each fire system object. For example, as illustrated in the BOM 412, the fire system can include 20 fire sensors, 25 smoke detectors, 15 heat detectors, 20 CO detectors, 12 pull stations, 10 MCPs, 25 sounders, 25 flashers, and 10,500 feet (ft) of cabling.

Further, the BOM 412 can include a price 434 of each fire system object. For example, the price per fire sensor can be $10.50, the price per smoke detector can be $17.50, the price per heat detector can be $15.00, the price per CO detector can be $12.50, the price per pull station can be $45.50, the price per MCP can be $11.50, the price per sounder can be $2.50, the price per flasher can be $16.99, and the price per foot of cabling can be $0.40/Ft.

Moreover, the BOM 412 can include a total 436 for each fire sensor type. For example, the total price for the fire sensors for the fire system can be $210.00, the total price for the smoke detectors for the fire system can be $437.50, the total price for the heat detectors for the fire system can be $225.00, the total price for the CO detectors for the fire system can be $250.00, the total price for the pull stations for the fire system can be $546.00, the total price for the MCPs for the fire system can be $115.00, the total price for the sounders for the fire system can be $62.50, the total price for the flashers for the fire system can be $424.75, and the total price for the cabling for the fire system can be $420.00.

Lastly, the BOM 412 can include a total price 438 for the fire system. For example, by adding the total price for each fire system object, the total price 438 for the fire system can be determined. As illustrated in FIG. 4, the total price 438 for the fire system can be $2,690.75. Such a price may be considered by a user at the site, such as a technician, engineer, etc. If such a price is acceptable, the user can cause the BOM 412 to be transmitted to a remote computing device in order to purchase the generated fire system for the space, as previously described in connection with FIG. 1.

Fire system floor plan layout generation according to the present disclosure can allow for automatic generation of a fire system floor plan using a floor plan layout. Automating generation of the fire system shown in the fire system floor plan can allow for a more efficient and user-friendly approach to fire system design as compared with previous approaches, as less users may be involved in the design of the fire system for the space. Further, such an approach can reduce reliance on skilled labor, as such an automated design approach still utilizes predetermined regulatory guidelines for fire system generation without the need for the user to consult, as such regulatory guidelines can be difficult to understand and interpret. Accordingly, fire system floor plan layout generation can reduce design, installation, commissioning, and maintenance costs associated with a fire system as compared with previous approaches.

FIG. 5 is an example of a computing device 502 for fire system floor plan layout generation, in accordance with one or more embodiments of the present disclosure. As illustrated in FIG. 5, the computing device 502 can include a memory 542 and a processor 540 for fire system floor plan layout generation in accordance with the present disclosure.

The memory 542 can be any type of storage medium that can be accessed by the processor 540 to perform various examples of the present disclosure. For example, the memory 542 can be a non-transitory computer readable medium having computer readable instructions (e.g., executable instructions/computer program instructions) stored thereon that are executable by the processor 540 for fire system floor plan layout generation in accordance with the present disclosure.

The memory 542 can be volatile or nonvolatile memory. The memory 542 can also be removable (e.g., portable) memory, or non-removable (e.g., internal) memory. For example, the memory 542 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 542 is illustrated as being located within computing device 502, embodiments of the present disclosure are not so limited. For example, memory 542 can also be located internal to another computing resource (e.g., enabling computer readable instructions to be downloaded over the Internet or another wired or wireless connection).

As illustrated in FIG. 5, computing device 502 includes a user interface 544. For example, the user interface 544 can display a fire system floor plan (e.g., as previously described in connection with FIGS. 1-4). A user (e.g., operator) of computing device 502 can interact with computing device 502 via the user interface 544. For example, user interface 544 can provide (e.g., display and/or present) information to the user of computing device 502, and/or receive information from (e.g., input by) the user of computing device 502. For instance, in some embodiments, user interface 544 can be a graphical user interface (GUI) that can provide and/or receive information to and/or from the user of computing device 502. The display can be, for instance, a touch-screen (e.g., the GUI can include touch-screen capabilities). Alternatively, a display can include a television, computer monitor, mobile device screen, other type of display device, or any combination thereof, connected to computing device 502 and configured to receive a video signal output from the computing device 502.

User interface 544 can be localized to any language. For example, user interface 544 can utilize any language, such as English, Spanish, German, French, Mandarin, Arabic, Japanese, Hindi, etc. Accordingly, the user interface 544 can display fire system floor plan in a language corresponding to a physical geographic location of the computing device 502.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for generating a fire system floor plan layout, comprising:
    a memory; and
    a processor that executes instructions stored in the memory to:
        receive a floor plan layout of a space that includes a plurality of rooms;
        detect the plurality of rooms on the floor plan layout of the space via an object placement model by analyzing the floor plan layout via machine learning to detect boundaries of the plurality of rooms;
        classify the plurality of rooms into corresponding room types;
        determine a quantity of fire system objects for each of the plurality of rooms based on dimensions of each of the plurality of rooms;
        determine a type of the fire system objects for each of the plurality of rooms based on the corresponding room type, wherein the type of the fire system objects includes one of a smoke detector, a heat detector, and a carbon monoxide detector;
        define, via the object placement model utilizing the floor plan layout, placement locations of the fire system objects for each of the plurality of rooms of the floor plan layout; and
        generate, using the object placement model, a fire system floor plan for a fire system for the space including the fire system objects, wherein the fire system objects are located in the defined placement locations on the fire system floor plan from the floor plan layout.

2. The computing device of claim 1, wherein the processor executes the instructions to determine a number of the fire system objects to be placed and define the placement locations of the number of fire system objects via machine learning based on the detected boundaries and predetermined regulatory guidelines included in the object placement model.

3. The computing device of claim 1, wherein the processor executes the instructions to classify the detected rooms into room types based on text recognition of the floor plan layout.

4. The computing device of claim 1, wherein the processor executes the instructions to display the object placement model for placement of the fire system objects and installation of the fire system objects at a corresponding physical location of the space.

5. The computing device of claim 1, wherein the processor executes the instructions to determine, based on the defined placement locations of the fire system objects on the fire system floor plan, a length of cabling to connect the fire system objects.

6. The computing device of claim 1, wherein the floor plan layout of the space is received as a computer-aided design (CAD) file format.

7. The computing device of claim 6, wherein the processor executes the instructions to convert the CAD file format to a graphic image file format.

8. The computing device of claim 1, wherein the floor plan layout of the space is received via a user input to the computing device.

9. A non-transitory computer readable medium having computer readable instructions stored thereon that are executed by a processor to:
receive a floor plan layout of a space that includes a plurality of rooms;
detect the plurality of rooms on the floor plan layout of the space via an object placement model by analyzing the floor plan layout via machine learning to detect boundaries of the plurality of rooms;
classify the plurality of rooms into corresponding room types;
determine a quantity of fire system objects for each of the plurality of rooms based on dimensions of the plurality of rooms;
determine a type of the fire system objects for each of the plurality of rooms based on the corresponding room type and predetermined regulatory guidelines;
define, via the object placement model utilizing the floor plan layout, placement locations of the fire system objects for each of the plurality of rooms of the floor plan layout via machine learning and the predetermined regulatory guidelines included in the object placement model; and
generate, using the object placement model:
a fire system floor plan for a fire system for the space including the fire system objects, wherein the fire system objects are located in the defined placement locations on the fire system floor plan from the floor plan layout; and
a bill of materials (BOM) for the fire system.

10. The non-transitory computer readable medium of claim 9, wherein the BOM includes the type of each fire system object.

11. The non-transitory computer readable medium of claim 9, wherein the BOM includes the quantity of each fire system object.

12. The non-transitory computer readable medium of claim 9, wherein the BOM includes a price of each fire system object and a total price for the fire system.

13. The non-transitory computer readable medium of claim 9, wherein the computer readable instructions are executed by the processor to transmit the BOM to a remote computing device to cause an order to be submitted for the fire system.

14. A system for generating a fire system floor plan layout, comprising:
a computing device, wherein the computing device is configured to:
detect a plurality of rooms on a floor plan layout of a space via an object placement model by analyzing the floor plan layout via machine learning to detect boundaries of the plurality of rooms;
classify the plurality of rooms of the floor plan layout of the space into corresponding room types;
determine a quantity of fire system objects for each of the plurality of rooms based on dimensions of the plurality of rooms;
determine a type of the fire system objects for each of the plurality of rooms based on the corresponding room type and predetermined regulatory guidelines of a geographic location of a facility utilizing the floor plan layout;
define, via the object placement model utilizing the floor plan layout, placement locations of the fire system objects for the floor plan layout via machine learning and the predetermined regulatory guidelines included in the object placement model;
determine, based on the defined placement locations of the fire system objects on the fire system floor plan, a length of cabling to connect the fire system objects within each of the plurality of rooms;
generate, using the object placement model:
a fire system floor plan for a fire system for the space including the fire system objects located in the defined placement locations on the fire system floor plan from the floor plan layout; and
a bill of materials (BOM) for the fire system including the fire system objects and cabling for the fire system objects; and
transmit the BOM to a remote computing device; and
the remote computing device, wherein the remote computing device is configured to cause an order to be placed for the fire system based on the BOM received from the computing device.

15. The system of claim 14, wherein the remote computing device causes the fire system to be shipped to a physical address associated with the computing device.

16. The system of claim 14, wherein:
the computing device transmits the fire system floor plan to a different computing device; and
the different computing device displays, via a display of the different computing device, the fire system floor plan.

17. The system of claim 14, wherein the fire system floor plan is a two-dimensional (2D) fire system floor plan.

18. The system of claim 14, wherein the fire system floor plan is a three-dimensional (3D) fire system floor plan.

19. The system of claim 14, wherein the remote computing device causes the order to be placed such that each of the fire system objects included in the BOM is pre-configured for placement at the defined placement locations on the fire system floor plan.

* * * * *